United States Patent [19]

Levy

[11] Patent Number: 5,357,429
[45] Date of Patent: Oct. 18, 1994

[54] THREE-DIMENSIONAL MODEL GENERATION USING MULTIPLE ANGLE TOMOGRAPHIC SCAN PLANES

[76] Inventor: Richard A. Levy, 127 Fieldcrest St., Apt. #204, Ann Arbor, Mich. 48103

[21] Appl. No.: 861,947

[22] Filed: Apr. 2, 1992

[51] Int. Cl.⁵ ............................................. G06F 15/42
[52] U.S. Cl. ............................ 364/413.15; 364/413.16
[58] Field of Search ...................... 364/413.13, 413.14, 364/413.15, 413.16

[56] References Cited

U.S. PATENT DOCUMENTS

| | | | |
|---|---|---|---|
| 4,138,721 | 2/1979 | Boyd | 364/414 |
| 4,252,025 | 2/1981 | Robinson | 73/621 |
| 4,497,322 | 2/1985 | Nagasaki | 128/660 |
| 4,582,065 | 4/1986 | Adams | 128/660 |
| 4,656,423 | 4/1987 | Sugimoto | 324/309 |
| 4,710,716 | 12/1987 | Keren et al. | 324/309 |
| 4,747,411 | 5/1988 | Ledley | 128/660 |
| 4,752,734 | 6/1988 | Wedeen | 324/306 |
| 4,831,528 | 5/1989 | Crawford et al. | 364/413.22 |
| 4,835,689 | 5/1989 | O'Donnell | 364/413.25 |
| 4,871,966 | 10/1989 | Smith et al. | 324/309 |
| 4,885,688 | 12/1989 | Crawford | 364/413.22 |
| 4,888,693 | 12/1989 | Tam | 364/413.16 |
| 4,914,589 | 4/1990 | Crawford | 364/43.17 |
| 4,977,505 | 12/1990 | Pelizzari et al. | 364/413.19 |
| 4,989,142 | 1/1991 | Crawford | 364/413.15 |
| 4,991,092 | 2/1991 | Greensite | 364/413.13 |
| 5,029,195 | 7/1991 | Danos | 378/121 |
| 5,034,694 | 7/1991 | Sattin et al. | 324/309 |
| 5,046,003 | 9/1991 | Crawford | 364/413.15 |

OTHER PUBLICATIONS

"Assessing Whether the Plane of Section on CT Affects Accuracy in Demonstrating Facial Fractures in 3-D Reconstruction When Using a Dried Skull", Richard A. Levy, M.D., et al., *AJNR*, Sep./Oct. 1991 pp. 861–866.
"Three–Dimensional Imaging", Elliot K. Fishman, M. D., et al. *Radiology*, Nov. 1991, pp. 321–337.

Primary Examiner—Roy N. Envall, Jr.
Assistant Examiner—A. Bodendorf
Attorney, Agent, or Firm—Basile and Hanlon

[57] ABSTRACT

Three-dimensional models are constructed from two-dimensional tomographic data collected from contiguous, substantially parallel, cross-sectional tomographic slices through an imaged object. The scan angle of each cross-sectional tomographic slice is variably disposed at a predetermined, non-perpendicular angle with respect to a longitudinal axis through the scanner/imaged object to better depict certain structures and/or shapes of the scanner/imaged object. Optimum scan angle generated two-dimensional tomographic data is selected to reconstruct three-dimensional images depicting the surface and/or interior structure of the imaged object. The optimum two-dimensional data set is supplied to a three-dimensional model generator to form a three-dimensional model of the imaged object.

2 Claims, 2 Drawing Sheets

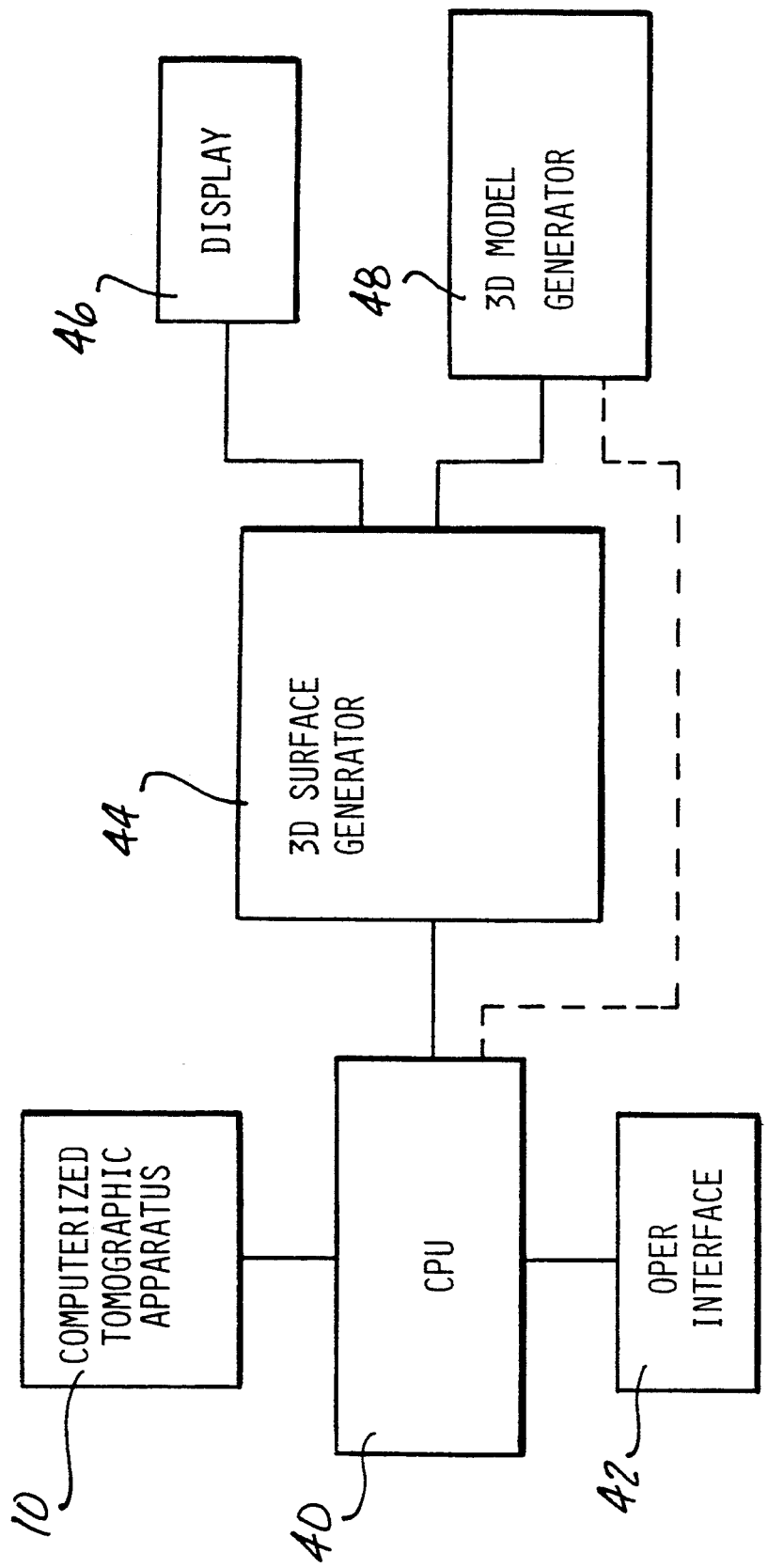

THREE-DIMENSIONAL MODEL GENERATION USING MULTIPLE ANGLE TOMOGRAPHIC SCAN PLANES

BACKGROUND OF THE INVENTION

1. Field of the Invention

The present invention relates, in general, to computerized tomography and, specifically, to three-dimensional models generated from computerized tomographic generated data.

2. Background Description

Three-dimensional imaging was pioneered in the late 970's and early 1980's and represents an advance in computerized imaging, which, as one of its medical applications, allows three-dimensional data routinely utilized in CAT (Computerized Axial Tomography) scanning or other imaging technologies (MRI, ultrasound, etc.) to be assembled into a three-dimensional image for display on a CRT screen or converted to a film record.

In three-dimensional computerized axial tomography, an X-ray source is collimated to form a fan beam which is transmitted through an imaged object to an X-ray detector array located in the same imaging plane as the X-ray source. The detected intensity of the transmitted radiation in the X-ray fan beam is dependent on attenuation of the X-ray beam by the imaged object. The intensity of the transmitted radiation is detected by the X-ray detector array.

Typically, the X-ray source and the detector array are mounted in a gantry having a through aperture through which the imaged object is moved. The X-ray source and detector array can be mounted for 360° rotation within the gantry around the imaged object. During each 360° rotation, a two-dimensional cross-sectional slice of the imaged object is generated by the detector array. Each cross-sectional slice is formed of a number of rows and columns of voxels. Each voxel has an anisotropic shape, i.e., generally rectangular, with typical dimensions of 1.5 mm×0.35 mm×0.35 mm for a high resolution study. The signal intensity of each voxel is represented by a digital number corresponding to the detected signal intensity, i.e., hounsfield unit, for each voxel.

Since a complete scan of the imaged object is made by moving the imaged object through the gantry, a plurality of contiguous, substantially parallel, cross-sectional tomographic slices are generated. The plurality of two-dimensional slices are reviewed by a radiologist, either on a display or on a film record, who mentally integrates the two-dimensional data into a three-dimensional image of the imaged object. Synthesized three-dimensional images are also generated from two-dimensional tomographic data. Such synthesis extracts a mathematical description of the imaged object from the plurality of two-dimensional tomographic data slices before reconstructing a three-dimensional image from the mathematical description using standard operator-dependent thresholding algorithms.

Such three-dimensional images, however, are subject to low accuracy with respect to depicting certain surfaces in an imaged object due to partial volume averaging principles used in generating a digital number corresponding to the signal intensity of each voxel. Partial volume averaging comes into play when a voxel contains a representation of more than one type of substance, i.e., tissue, bone, air, etc. Such a voxel is represented by an average value of these substances based on the percentage occupancy of the voxel by the different substances as well as certain imaging characteristics of tissues (i.e., linear attenuation coefficient in X-ray computerized tomography). For example, a region of low intensity in the imaged object which is parallel to the scan or image plane would occupy only a small portion of the voxels in a particular cross-sectional slice. Such a region will not effect the voxel density as significantly as when the region of low density occupies a greater proportion of individual voxels as might occur when the region of low density is perpendicular to the scan or image plane.

Such perpendicular or parallel orientation of regions of an imaged object results from the orientation of the scan angles or scan planes normally used in computerized tomography. At the present, only a transaxial scan plane, i.e., a scan plane which is oriented perpendicular to the longitudinal axis of the scanner/imaged object, is routinely utilized for three-dimensional reconstructions. This is the consequence of the earlier generation of three-dimensional reconstruction computer programs which could only use transaxial two-dimensional computerized tomography data. Thus, the use of transaxial oriented scan planes does not alone provide the desired accuracy for computerized tomography data to generate three-dimensional images or models of an imaged object.

Varying the scan angle has been proposed to better visualize certain structures within an imaged object. In this process, the scan plane for a number of continuous, tomographic cross-sectional slices is tilted or oriented at a predetermined angle other than 90° to the longitudinal axis of the scanner/imaged object. However, this results in a geometrically distorted image which must be corrected in the reconstruction algorithms to remove the distortion. This technique utilizes a non-perpendicular scan plane angle to generated tomographic data cross-sectional slices with no indication of whether the predetermined angle is optimum for visualizing certain regions of the imaged object.

Thus, it would be desirable to provide a three-dimensional model generation process utilizing multiple angle scan planes which are non-perpendicular to the longitudinal axis of the scanner/imaged object to optimize the generation of three-dimensional models from two-dimensional tomographic data.

SUMMARY OF THE INVENTION

The present invention is a method for generating a three-dimensional model of a surface of an imaged object from two-dimensional tomographic data. The method comprises the steps of:

a. Inclining a tomographic data generator apparatus at a predetermined non-perpendicular angle with respect to the longitudinal axis of the scanner/imaged object;

b. Generating a plurality of contiguous, substantially parallel, tomographic cross-sectional slices of the imaged object, each cross-sectional slice being inclined at a predetermined, non-perpendicular angle with respect to the longitudinal axis of the scanner/imaged object;

c. Generating a plurality of two-dimensional data sets collectively defining the three-dimensional surface of the body from the tomographic cross-sectional slices;

d. Repeating steps a, b, and c a plurality of times, during each time inclining the tomographic data generator apparatus at a different, non-perpendicular angle with respect to the longitudinal axis of the scanner/imaged object;

e. Selecting the two-dimensional data set which results in the most accurate three-dimensional image of the imaged object; and f. Generating a three-dimensional model from the selected two-dimensional data set.

Optionally, a three-dimensional image of the surface of the scanner/imaged object may be generated from the plurality of two-dimensional data sets at each or any predetermined, non-perpendicular scan angle to aid in the selection of the optimal two-dimensional data set.

By performing multiple sets of tomographic scans, each at a different, non-perpendicular scan angle with respect to the longitudinal axis of the scanner/imaged object, the present method enables a three-dimensional model to be generated from the imaged object which overcomes and/or makes use of partial volume averaging principles employed in tomographic imaging systems to accurately depict the surface or structure of the imaged object which has heretofore been difficult to accurately depict using only transaxial computerized tomography scan planes. The operator can select which of the multiple sets of two-dimensional tomographic data yields the most accurate three-dimensional reconstruction. The method of the present invention is employed at the data collection stage of the tomographic process so as to accommodate any changes in the tomographic image reconstruction software used to reconstruct a three-dimensional image from the two-dimensional tomographic data.

BRIEF DESCRIPTION OF THE DRAWING

The various features, advantages and other uses of the present invention will become more apparent by referring to the following detailed description and drawing in which:

FIG. 2 is a block diagram of the apparatus for generating a three-dimensional model of the imaged object according to the present inventive method.

DESCRIPTION OF THE PREFERRED EMBODIMENT

Figure 1:
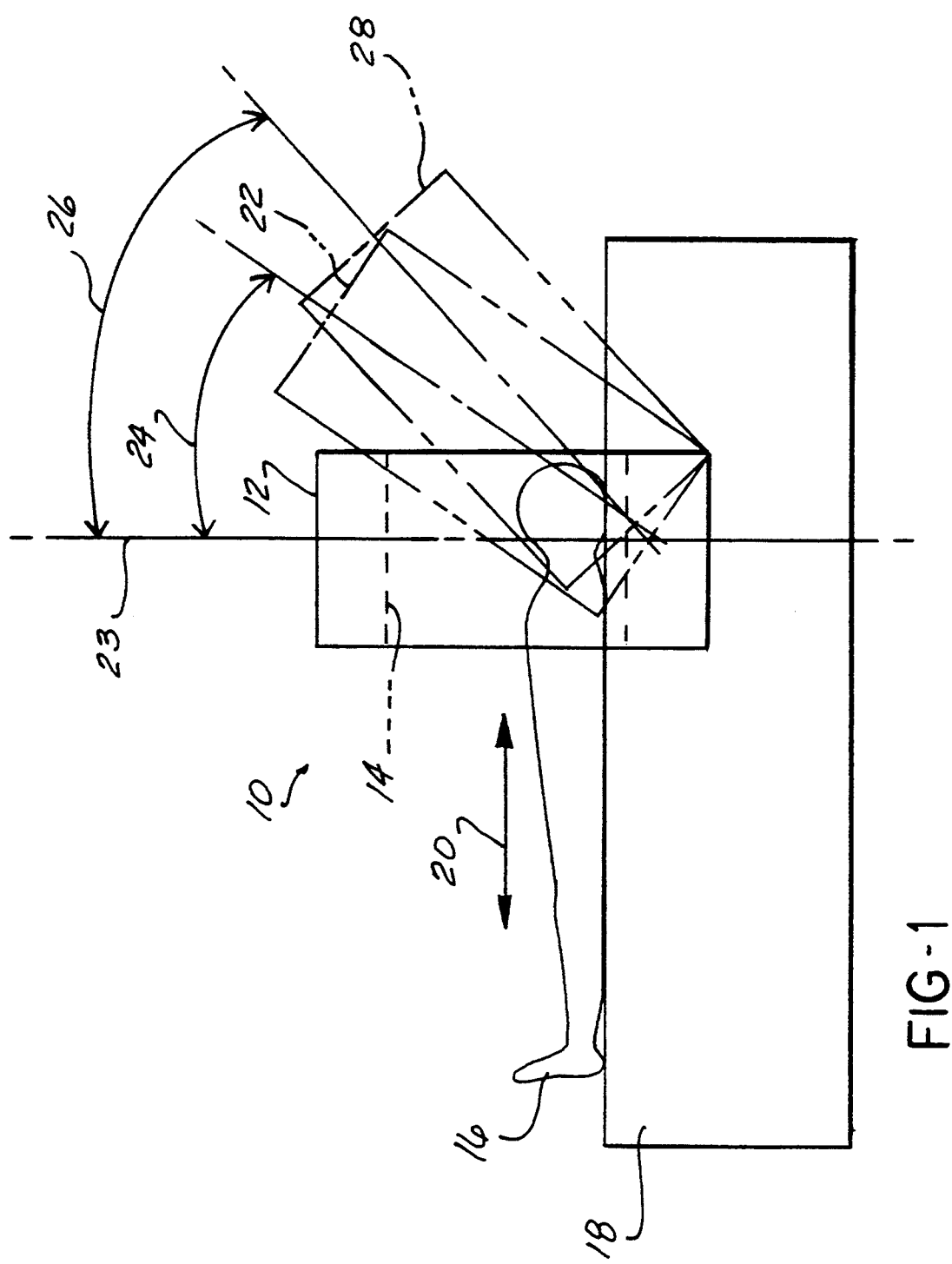
FIG. 1 is a side elevational view of a conventional computerized tomographic apparatus receiving an imaged object.

Referring now to the drawing, and to FIG. 1 in particular, there is depicted a two-dimensional computerized tomographic apparatus for obtaining two-dimensional tomographic data used to generate a three-dimensional model of an imaged object or a surface or portion of an imaged object. The computerized axial tomographic apparatus 10 may be any conventional scanning apparatus such as a GE 9800. Such devices are operative to generate an X-ray scan forming a cross-sectional slice of the imaged object. As the imaged object is moved through the gantry portion of the tomographic scanner 10, a plurality of contiguous, substantially parallel cross-section scans are generated. Such scans are displayed on a suitable display or monitor or translated to a film record for interpretation by a radiologist. The radiologist mentally integrates the two-dimensional images into a three-dimensional representation of the imaged object. Computerized three-dimensional imaging is also available for displaying or reducing to a film record, a three-dimensional reconstructed image of the plurality of two-dimensional tomographic data cross-sectional slices.

It will be understood that although the present method is disclosed as being used with a computerized axial tomographic apparatus 10, it is also usable with other imaging processes, such as MRI, ultrasound, etc.

As shown in FIG. 1, the computerized tomographic apparatus 10 includes a gantry 12 having a central aperture 14 extending therethrough. The aperture 14 in the gantry 12 receives an imaged object 16 therethrough. The imaged object 16 may be any object, such as a human body or body part. The imaged object 16 is typically mounted on a movable table or platform for movement through the aperture 14 in the gantry 12.

An X-ray source, not shown, is mounted in the gantry 12 and is rotatable through a 360° path about a horizontal axis centered in the aperture 14. The X-ray source generates a fan beam scan of the imaged object 16. X-ray detectors, also not shown, are mounted in the gantry 12 and detect the intensity of the X-ray beam from the X-ray source after the X-ray beam has passed through the imaged object 16. Such X-ray beam is attenuated by the imaged object thereby proving an intensity signal indicative of the structure of the imaged object through which a particular X-ray beam has passed.

The result of each 360° scan by the X-ray source in the gantry 12 is a cross-sectional slice of the imaged object 16. Each cross-sectional slice is formed of rows and columns of voxels which are generally rectangularly-shaped (anisotropic) elements. Typically, each voxel has dimensions of 1.5 mm×0.35 mm×0.35 mm for a high resolution scan. The end face of each voxel corresponds to a pixel in a display such that, for example, a 512×512 pixel display may be used to depict the intensity of each voxel in a particular cross-sectional slice.

A digital number is assigned to the signal intensity of each voxel as represented by the Hounsfield unit of the detected signal intensity. Such signal intensity will vary depending upon the amount of attenuation of the X-ray beam as it passes through a portion of the imaged object 16 and is attenuated in varying degrees by bone, tissue, air, etc., in the imaged object 16.

Computerized axial tomographic apparatus utilize a principle termed "partial volume averaging". Partial volume averaging occurs when a voxel in a particular cross-sectional slice of a computerized tomographic scan contains more than one tissue type. The signal intensity of the voxel is therefore represented as an average value of these different tissue types based on the percentage occupancy of the voxel by the tissue types as well as certain imaging characteristics of the tissues (i.e., linear attenuation coefficient in the setting of X-ray computerized tomography). For example, when a region of low density tissue is oriented parallel to the scan plane, the region of low density will occupy only a small portion of the voxels in a particular cross-sectional slice and will not effect voxel density as significantly as when this region of low density occupies a greater portion of the individual voxels. Implementation of partial volume averaging to generate digital signals representative of the signal intensity of each voxel may overlook the region of low density such that it may not be detected. On the other hand, when the region of low density is oriented perpendicular to the scan or imaging plane, the region occupies the entire volume of each voxel and will be accurately recorded in the resultant measured voxel density. The present invention is intended to overcome or make use of the partial volume averaging principle to provide accurate two and three-dimensional images of the imaged object suitable for use in constructing three-dimensional models of the imaged object.

FIG. 1 depicts the gantry 12 in a normal, 90° or transaxial scan plane orientation with respect to the longitudinal axis 20 of the scanner 18 and the imaged object 16. This gantry orientation is that typically employed in computerized tomography. Movement of the imaged object 16 through the gantry 12 and the generation of successive X-ray scans of the X-ray source will result in a plurality of substantially parallel, cross-sectional scans of the imaged object 16. In order to overcome the problems noted above with respect to the implementation of partial volume averaging in representing the signal intensity of each voxel in each cross-sectional slice, the present method tilts or orients the gantry 12 at a predetermined, non-perpendicular angle with respect to the longitudinal axis 20 of the scanner 18 and the imaged object 16. As shown in phantom in FIG. 1 and represented by reference numeral 22, the gantry 22 is oriented at a first predetermined, non-perpendicular angle 24 from a vertical plane disposed perpendicular to the longitudinal axis 20 of the imaged object 16. Successive scans of the imaged object 16 as the imaged object 16 is moved through the gantry 12 when disposed at the angle 24 will result in two-dimensional tomographic cross-sectional slices, each disposed at the predetermined, non-perpendicular angle 24. The gantry 12 is then moved to a different, non-perpendicular angle as denoted by reference number 26 and shown in phantom by reference number 28 in FIG. 1. Multiple scans are again made of the imaged object 16. A trained radiologist can interpret the two-dimensional scans of each set of scans, each at different angles from a vertical plane oriented perpendicular to the longitudinal axis 20 of the scanner 18 and the imaged object 16, to determine which set best depicts all of the internal structure or surface features of the imaged object 16. Three-dimensional images derived from the multiple sets of two-dimensional data may also be helpful in selecting an optimal two-dimensional data set. Additional scans, each at a different angle from the vertical plane 23, may also be performed to obtain an optimum set of tomographic scans which best depicts all internal structure and/or surface features of the imaged object 16.

It is this optimum set of two-dimensional tomographic data formed of a plurality of substantially parallel cross-sectional scans, each scan disposed at a predetermined angle from a vertical plane oriented perpendicular to the longitudinal axis 20 of the scanner 18 and the imaged object 16, which is used to generate a three-dimensional model or prosthesis of the imaged object 16.

FIG. 2 represents an apparatus for implementing the method of the present invention. A central processing unit or computer 40 receives operator commands from an operator interface 42 to control the cross-sectional slice location and spacing and the scan or gantry angle of the computerized tomographic apparatus 10.

As is conventional, the central processing unit 40 reconstructs two-dimensional computerized tomographic data from the X-ray detectors in the scanner 10. The two-dimensional tomographic data is supplied to a three-dimensional surface generator apparatus 44 which may be incorporated into a central processing unit executing conventional imaging software, such as GE 3-D 98 Quick or a free-standing, dedicated three-dimensional workstation such as an ISG Camra Allegra. Such software utilizes thresholding and surface detection algorithms to reconstruct a three-dimensional image from the plurality of two-dimensional tomographic cross-sectional scans.

The reconstructed three-dimensional image may be output to a suitable display 46 to visually depict the reconstructed three-dimensional image of the imaged object 16. Alternately, the two-dimensional or reconstructed three-dimensional surface data obtained from the method of the present invention is output to a suitable three-dimensional model generator which 48 may be any suitable machine for creating three-dimensional models or prostheses.

Such three-dimensional model generators 48 may include a computer-driven, multi-axis milling machine which mills a model from a pre-existing block of material. In addition, three-dimensional model generators 48 usable with the present invention may be those which build a model layer upon layer utilizing a laser beam to harden a polymer, resin, etc. In the latter type of model generator, a computer-guided laser beam tracks along a path determined by the two-dimensional data and fuses a substrate, such as a liquid resin in stereolithography and a variety of powders in laser scintering, in a pattern that corresponds to the two-dimensional data. This fused layer then serves as a base for successive resin/powder layers.

In summary, there has been disclosed a unique method for generating a three-dimensional model of a surface or internal structure of an imaged object from two-dimensional tomographic data. The present method utilizes multiple scan planes, each at a different predetermined angle with respect to the longitudinal axis of the scanner/imaged object, to obtain optimum two-dimensional tomographic data accurately depicting each surface or internal structure of the imaged object. This results in more accurate three-dimensional models or prostheses of the imaged object.

What is claimed is:

1. A method for generating a three-dimensional model of a surface of an imaged object from two-dimensional tomographic data comprising the steps of:

inclining a tomographic data generator apparatus at a predetermined non-perpendicular angle with respect to the longitudinal axis of the scanner/imaged object;

generating a plurality of contiguous, substantially parallel, tomographic cross-sectional slices of the imaged object, each cross-sectional slice being inclined at a predetermined, non-perpendicular angle with respect to the longitudinal axis of the scanner/imaged object;

generating a plurality of two-dimensional data sets collectively defining the three-dimensional surface of the body from the tomographic cross-sectional slices;

repeating the above steps a plurality of times, during each time inclining the tomographic data generator apparatus at a different, non-perpendicular angle with respect to the longitudinal axis of the imaged object;

selecting two-dimensional data set which results in the most accurate three-dimensional image of the imaged object; and generating a three-dimensional model from the selected two-dimensional data set.

2. The method of claim 1 further comprising the step of:

generating a three-dimensional image of the surface of the imaged object from the plurality of two-dimensional data sets at each predetermined, non-perpendicular scan angle.

* * * * *